United States Patent
Chung et al.

(10) Patent No.: US 9,904,348 B2
(45) Date of Patent: Feb. 27, 2018

(54) ELECTRONIC DEVICE AND CONTROL METHOD

(71) Applicant: Acer Incorporated, New Taipei (TW)

(72) Inventors: Hsing-Lung Chung, New Taipei (TW); Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 39 days.

(21) Appl. No.: 14/670,570

(22) Filed: Mar. 27, 2015

(65) Prior Publication Data

US 2015/0293581 A1    Oct. 15, 2015

(30) Foreign Application Priority Data

Apr. 10, 2014   (TW) .............................. 103113179 A (51) Int. Cl.
| | |
|---|---|
| *G06F 3/00* | (2006.01) |
| *G06F 1/32* | (2006.01) |
| *G06F 3/041* | (2006.01) |
| *G06F 3/044* | (2006.01) |

(52) U.S. Cl.
CPC .......... *G06F 1/3287* (2013.01); *G06F 1/3262* (2013.01); *G06F 3/044* (2013.01); *G06F 3/0416* (2013.01)

(58) Field of Classification Search
None
See application file for complete search history.

(56) References Cited

U.S. PATENT DOCUMENTS

| 2005/0071702 A1* | 3/2005 | Morisawa ............. G06F 1/3203 |
| | | 713/320 |
| 2009/0251433 A1 | 10/2009 | Park et al. |
| 2009/0315835 A1 | 12/2009 | De Goes et al. |

(Continued)

FOREIGN PATENT DOCUMENTS

| CN | 101232743 A | 7/2008 |
| CN | 101242442 A | 8/2008 |

(Continued)

OTHER PUBLICATIONS

TW Office Action dated Apr. 29, 2015 in corresponding Taiwan application (No. 103113179).

(Continued)

*Primary Examiner* — Henry Tsai
*Assistant Examiner* — Dean Phan
(74) *Attorney, Agent, or Firm* — McClure, Qualey & Rodack, LLP (57) ABSTRACT

An electronic device and a control method thereof are described. The control method is adopted by an electronic device which includes a touch panel, a processing unit and an IO port. The control method includes: executing an application, and outputting an output signal from the IO port to an external device according to the application; receiving sense energies, by a plurality of sense units of the touch panel; setting the sense unit with the sense energy exceeding a predetermined energy as a touched sense unit; and when a first condition is met, stopping or suspending, by the processing unit, the application; wherein the first condition includes a touch trail formed by the touched sense units stretching from the first side to the second side and lasting for a predetermined period.

10 Claims, 6 Drawing Sheets

(56) References Cited

U.S. PATENT DOCUMENTS

| | | | | |
|---|---|---|---|---|
| 2011/0279380 A1* | 11/2011 | Weber | ................... | G06F 3/016 |
| | | | | 345/173 |
| 2012/0306767 A1* | 12/2012 | Campbell | ........... | G06F 3/04886 |
| | | | | 345/173 |
| 2014/0152581 A1* | 6/2014 | Case | ..................... | G06F 3/041 |
| | | | | 345/173 |
| 2014/0281962 A1* | 9/2014 | Won | ................... | G06F 3/0482 |
| | | | | 715/705 |

FOREIGN PATENT DOCUMENTS

| | | |
|---|---|---|
| CN | 101655736 A | 2/2010 |
| CN | 102983869 A | 3/2013 |
| TW | M325544 U | 1/2008 |
| TW | 201337663 A | 9/2013 |

OTHER PUBLICATIONS

CN Office Action dated Oct. 19, 2017 in Chinese application (No. 201410187960.3).
Search Report issued in CN Office Action dated Oct. 19, 2017 in Chinese application (No. 201410187960.3).

\* cited by examiner

ELECTRONIC DEVICE AND CONTROL METHOD

CROSS REFERENCE TO RELATED APPLICATIONS

This Application claims priority of Taiwan Patent Application No. 103113179, filed on Apr. 10, 2014, the entirety of which is incorporated by reference herein.

BACKGROUND OF THE INVENTION

Field of the Invention

The present invention relates to an electronic device with a touch panel, and in particularly, to an electrical device and control method thereof.

Description of the Related Art

Today, mobile devices not only provide touch panels for easy usage, but also include an Input/output (IO) port for delivering signals between electronic devices. For example, when a user would like to listen to music, he or she can connect an earphone to the IO port of the electronic device to receive the music signal from the electronic device.

When a user no longer desires to listen to music, the connection cable of the earphone is often wound around the mobile device for easy storage. Nevertheless, some users would wind the connection cable of an earphone to the mobile device without terminating the application, resulting in a waste of energy. Therefore, a control method is needed.

BRIEF SUMMARY OF THE INVENTION

A detailed description is given in the following embodiments with reference to the accompanying drawings.

An embodiment of an electronic device is described, comprising a touch panel, a processing unit, and an input/output (IO) port. The touch panel contains a plurality of sense units, wherein each sense unit is configured to receive sense energy, and the touch panel includes a first side and a second side opposite thereto. The processing unit is configured to execute an application, output an output signal according to the application, and set the sense unit with the sense energy exceeding a predetermined energy level as a touched sense unit. The IO port, electrically coupled to an external device, is configured to transmit the output signal to the external device. When a first condition is met, the processing unit is configured to stop or suspend the application. The first condition includes a touch trail formed by the touched sense units stretches from the first side to the second side and lasts for a predetermined period.

Another embodiment of a control method is disclosed, adopted by an electronic device which comprises a touch panel, a processing unit and an IO port, the control method including: executing an application, and outputting an output signal from the IO port to an external device according to the application; receiving sense energies, by a plurality of sense units of the touch panel; designating the sense unit with the sense energy exceeding a predetermined energy as a touched sense unit; and when a first condition is met, stopping or suspending, by the processing unit, the application; wherein the first condition includes a touch trail formed by the touched sense units stretching from the first side to the second side and lasting for a predetermined period.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
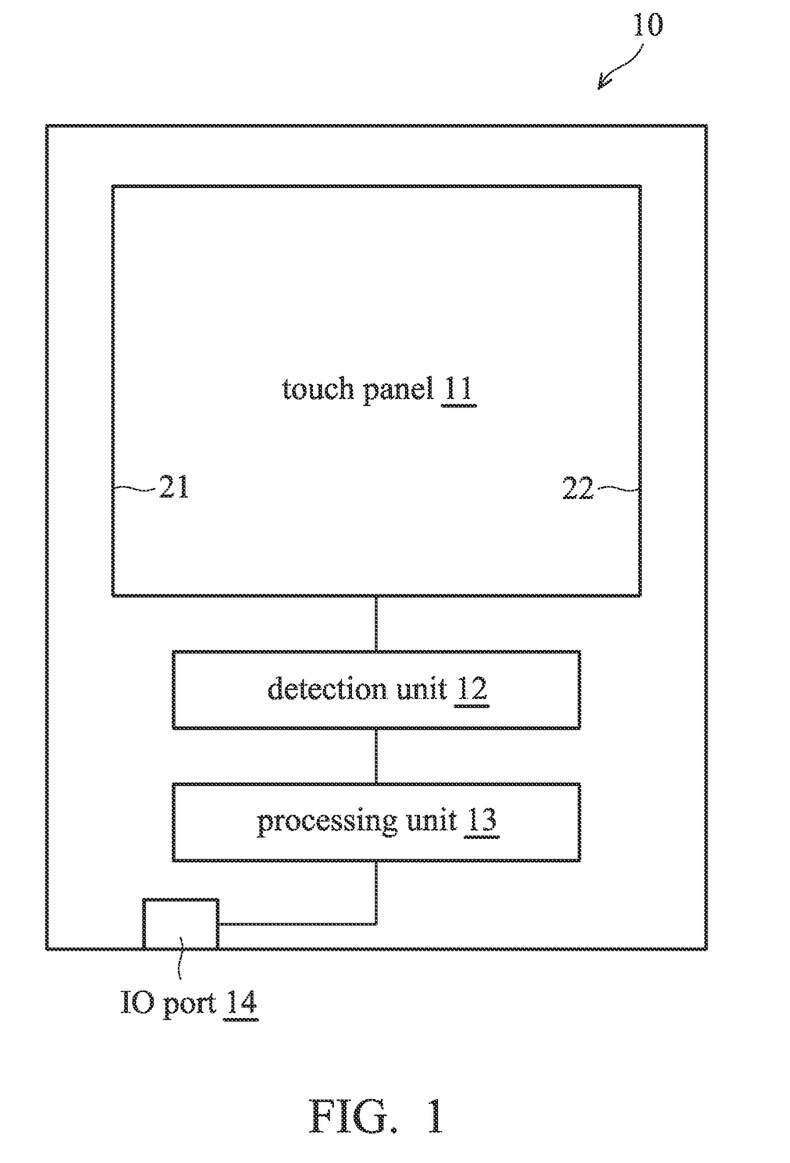
FIG. 1 is a circuit schematic of an electronic device according to an embodiment of the invention.

FIG. 1 is a circuit schematic of an electronic device according to an embodiment of the invention. The electronic device 10 may be, but is not limited to, a tablet computer or a smartphone. As shown in FIG. 1, the electronic device 10 includes, but is not limited to, a touch panel 11, a detection unit 12, a processing unit 13, and an input/output (IO) port 14. In one embodiment, the touch panel 11, the detection unit 12, the processing unit 13, and the IO port 14 are connected by bus connections.

Figure 2:
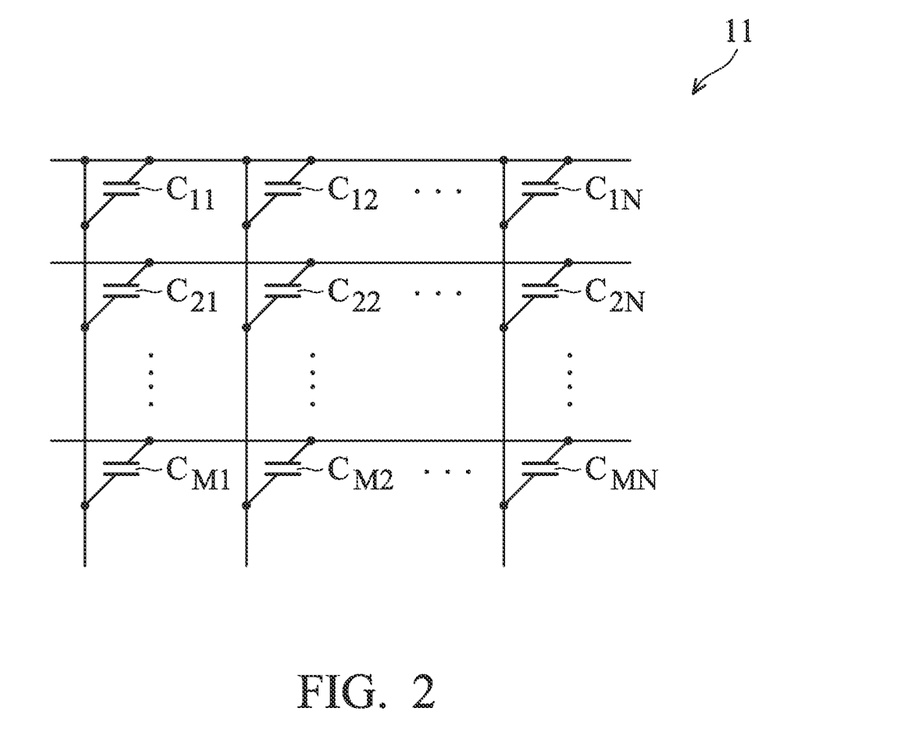
FIG. 2 illustrates a schematic diagram of the touch panel in FIG. 1.

As depicted in FIG. 1, the touch panel 11 contains a first side 21 and a second side 22 on the opposite side of the first side 21. FIG. 2 illustrates a schematic diagram of the touch panel in FIG. 1. As shown in FIG. 2, the touch panel 11 contains a plurality of sense units $C_{11}$-$C_{1N}$, $C_{21}$-$C_{2N}$, and $C_{M1}$-$C_{MN}$, and each sense unit is configured to receive sense energy. In one embodiment, the sense unit is a capacitor containing electric charge. When the user touches the sense unit with a finger, the sense unit receives sense energy from the finger, so that the electric charges contained in the sense unit is changed. In another embodiment, the sense unit receives, but not limited to receiving, an electromagnetic energy which causes the electric charge in the sense unit to be changed.

Turning back to FIG. 1, the detection unit 12 is configured to detect sense energy of each sense unit according to the change of the electric charge in the sense unit. In the embodiment, the sense energy of the sense unit is proportional to a change in the electric charge. In one embodiment, when the electric charge of the sense unit is changed, the voltage of the sense unit also varies accordingly. As a result, the detection unit 12 can determine the sense energy by, but is not limited to determining the sense energy by, detecting a change in the voltage of the sense unit.

The processing unit 13 may be, but is not limited to being, a central-processing unit (CPU), a chip controller or a micro controller. In the embodiment, the processing unit 13 is configured to execute an application to output an output signal. For example, when a user selects a music player program, the processing unit 13 is configured to execute the music player program accordingly, and output a music signal via the IO port 14. In the embodiment, the processing unit 13 is further configured to set the sense unit to which the detection unit 12 detects that the sense energy exceeds a predetermined energy level as a touched sense unit. In another embodiment, the processing unit is configured to execute an application and receive an input signal from an external device. For example, when a user selects a record program, the processing unit is configured to execute the record program and receive an audio signal from a microphone.

The IO port 14 may be, but is not limited to being, a USB connection port, an earphone jack, a microphone jack, or a high-definition multimedia interface (HDMI) jack. In the embodiment, the external device is connected to the electronic device 10 via the IO port 14. The external device and the electronic device 10 can exchange or receive messages from each other via the IO port 14. For example, when the external device is an earphone, the earphone can be connected to the electronic device 10 through the IO port 14, and receive the music signal from the electronic device 10. In another embodiment, when the external device is a headset, the headset can be connected to the electronic device 10 through the IO port 14 to deliver the voice signal to the electronic device 10 or receive the music signal from the electronic device 10. In another embodiment, the IO port 14 is an HDMI jack, configured to deliver images and audio signals to the external device. It should be noted that the electronic device 10 may include, but is not limited to, a plurality of IO ports 14 with the same or different functionalities. For example, the electronic device 10 includes, but is not limited to, a USB connection port, an earphone jack, a microphone jack, and a high HDMI jack.

Figure 3A:
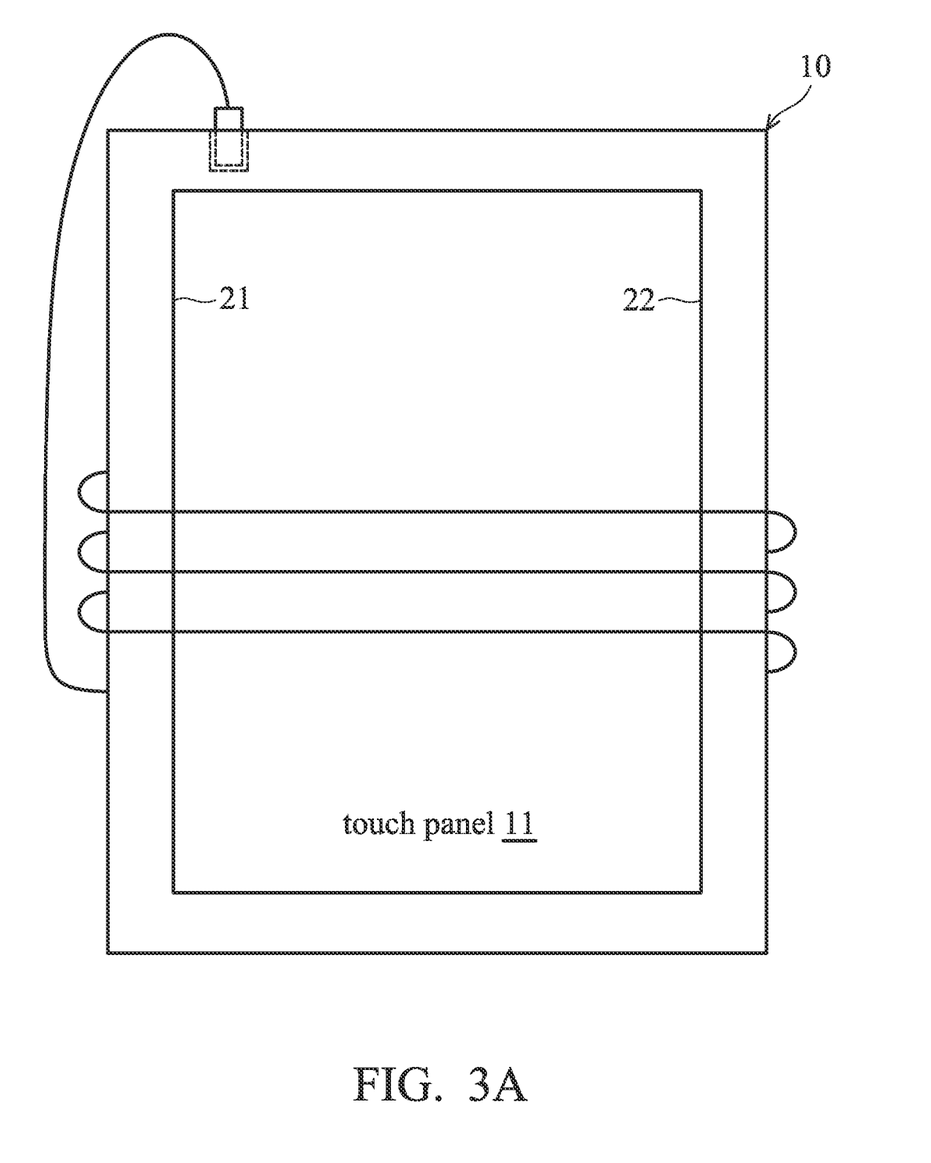
FIG. 3A shows a schematic diagram of an electronic device wound around an external device according to an embodiment of the invention.

Please refer to FIG. 3A, which shows a schematic diagram of an electronic device wound around an external device according to an embodiment of the invention. As illustrated in FIG. 3A, the IO port 14 of the electronic device 10 is connected to an external device. For example, the IO port 14 is connected to an earphone and the user winds the earphone, but is not limited to, around the electronic device 10. When one end of the earphone is stored in the IO port 14 and wound around the electronic device 10, the music player program can continue playing music, so that the earphone can receive the music signal from the electronic device 10. When the music signal is delivered from the electronic device 10 to the earphone, the music signal passing through the wound earphone cable produces an electromagnetic effect, causing the touch panel to receive the sense energy. In one embodiment, the sense energy received by the sense unit is proportional to, and not limited to, the magnitude of the output signal or the number of turns of the connection cable of the external device wound around the electronic device. For example, the sense energy received by the sense unit increases with the magnitude of the output signal. In another example, when the number of turns of the connection cable of the external device wound around the electronic device exceeds, but is not limited to 3 exceeding, the sense energy received by the sense unit exceeds a predetermined energy.

Figure 3B:
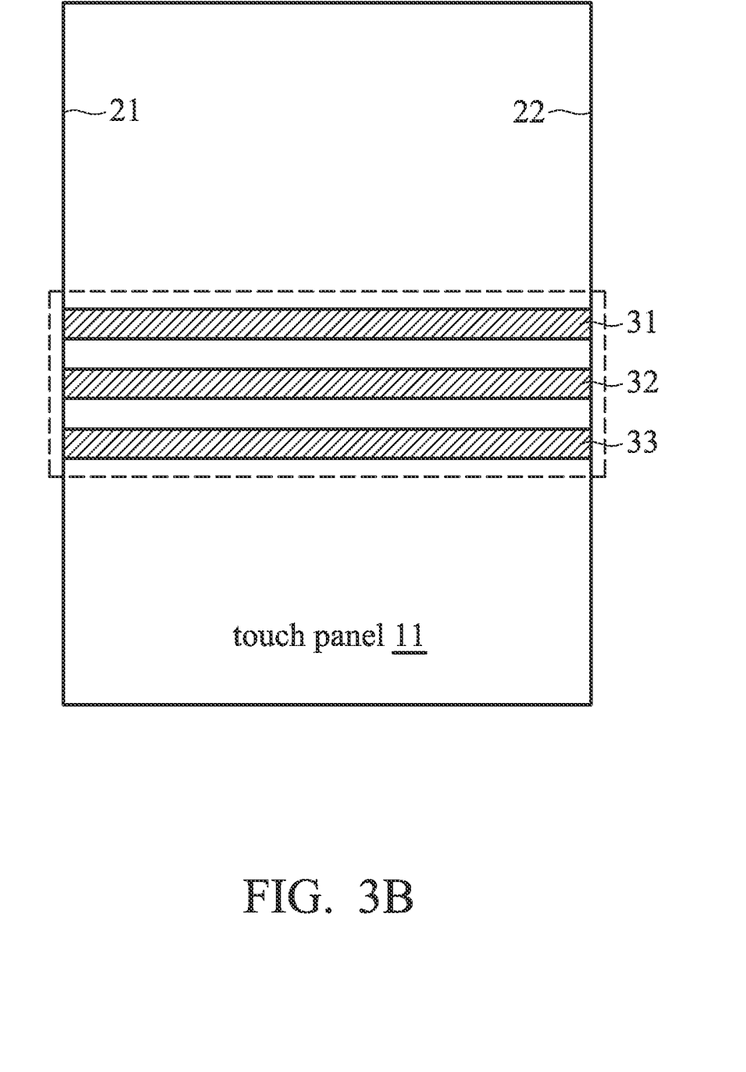
FIG. 3B shows a schematic diagram of an electronic device wound around an external device according to another embodiment of the invention.

When the external device is wound around the electronic device 10 and causes the sense energy received by the sense unit of the touch panel 11 to exceed the predetermined energy, the processing unit 13 will set the sense unit which senses the sense energy exceeding the predetermined energy as a touched sense unit. For example, as shown in FIG. 3B the processing unit 13 sets the sense units with the sense energy exceeding the predetermined energy as the touched sense units, and consequently determines touch trails 31, 32, and 33.

In one embodiment, when a first condition is met, the processing unit 13 is configured to stop or suspend the application. In the embodiment, the first condition is, and is not limited to being, the touch trail formed by the touched sense units stretching from the first side 21 to the second side 22 of the touch panel 11 and lasting for a predetermined period. For example, when the touch trail 31 formed by the touched sense units in FIG. 3B stretches from the first side 21 to the second side 22 of the touch panel 11, and the first touch trail lasts for 1 minute, the processing unit 13 can determine that the first condition is met. In another embodiment, when the first condition is met, the processing unit 13 not only terminates the application, but also turns off the touch panel 11, stop the displaying of data on the touch panel 11, and not limited thereto.

In another embodiment, the first condition further includes the sense energy of the touched sense unit varying with the magnitude of the output signal. For example, when the output signal is a music signal, the touch energy of the touched sense unit in FIG. 3B varies with the magnitude of the music signal. In one embodiment, the sense energy of the touched sense unit is, and is not limited to being, proportional to the magnitude of the music signal. For example, the magnitude of the music signal increases with the volume output by the music player application, and consequently the sense energy received by the sense unit is increased accordingly.

In one embodiment, the processing unit 13 may adjust, but is not limited to adjusting, the magnitude of the signal output from the application to determine whether the sense energy received by the sense unit varies with the magnitude of the output signal. For example, the processing unit 13 may adjust the volume output by the music player application, and observe whether the sense energy received by the sense unit shows a corresponding variation.

In another embodiment, the processing unit 13 may inject, but is not limited to injecting, a test signal into the output signal output from the processing unit 13, and observe whether the sense energy received by the sense unit varies with the output signal injected by the test signal. In another embodiment, the processing unit 13 stops the signal output by the application, and sends a test signal to the external device as a new output signal. Next, the processing unit 13 observes, and is not limited to observing, whether the sense energy of the touched sense unit varies with the test signal.

In another embodiment, the external device is a microphone and the application is a recording application which receives a speech signal from a microphone. When the microphone cable is wound around the electronic device 10 (as shown in FIG. 3A), the sense unit will receive the sense energy caused by the speech signal sent from the microphone to the electronic device 10. The processing unit 13 determines whether the sense unit is touched and the sense energy meets the first condition in the embodiments of FIGS. 3A and 3B. Similarly, when the first condition is met, the processing unit 13 can stop or suspend the recording application.

Figure 4A:
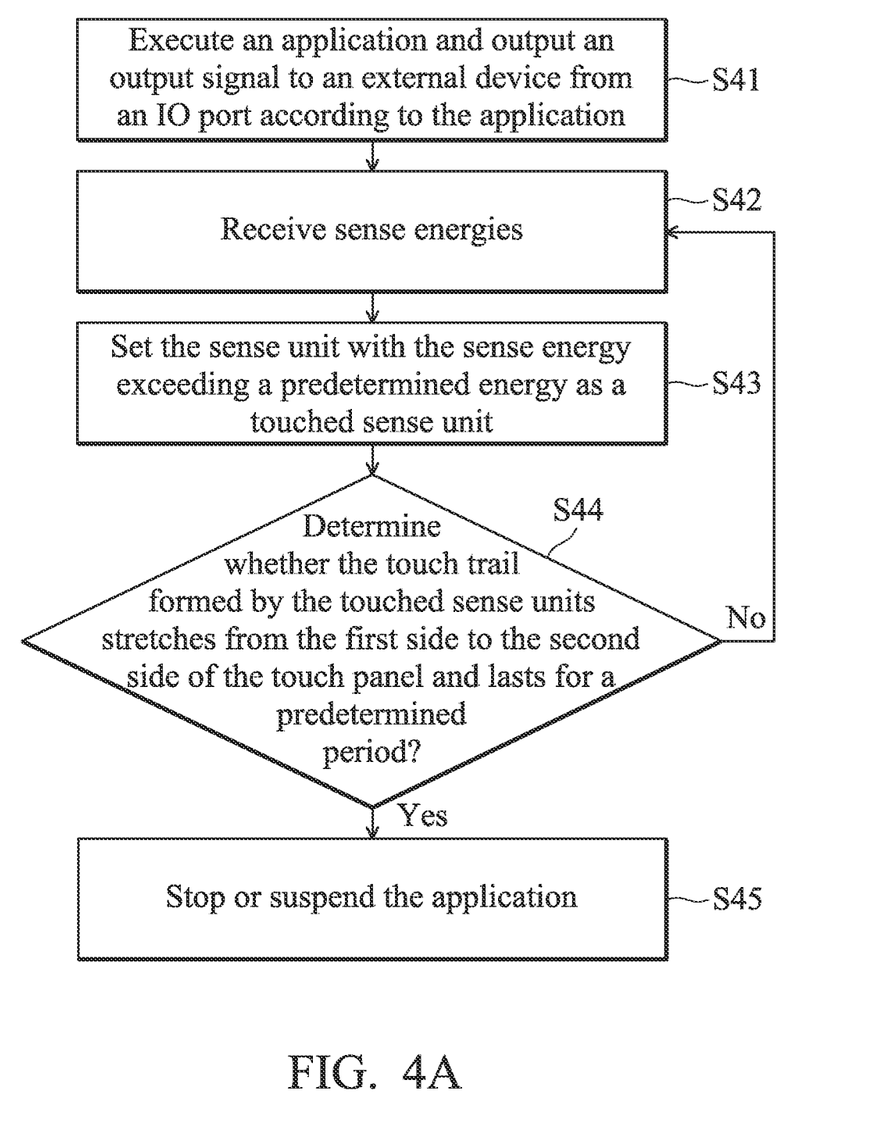
FIG. 4A shows a flowchart of an embodiment of the invention.

Please Refer to FIG. 4A, which shows a flowchart of an embodiment of the invention. The flowchart starts at Step S41, where the processing unit 13 performs an application and outputs an output signal from the IO port 14 to the external device based on the application, then the method proceeds to Step S42. For example, the processing unit 13 executes a music player application, and outputs a music signal from the IO port 14 to an earphone. In Step S42, the sense unit of the touch panel 11 receives the sense energy, and enters Step S43. In one example, the touch panel 11 contains a plurality of sense units, wherein each sense unit is configured to receive sense energy. In Step S43, the processing unit 13 sets the sense unit with the sense energy exceeding a predetermined energy as a touched sense unit, and the method proceeds to Step S44.

In Step S44, the processing unit 13 determines whether the touch trail formed by the touched sense units stretches from the first side 21 to the second side 22 of the touch panel 11 and lasts for a predetermined period. When the processing unit 13 determines that the touch trail formed by the touched sense units stretches from the first side 21 to the second side 22 of the touch panel 11 and lasts for the predetermined period, Step S45 is entered. Otherwise, the embodiment returns to Step S42.

In Step S45, the processing unit 13 stops or suspends the application. For example, the processing unit 13 stops playing the music player application, and stops outputting the music signal from the IO port 14. In another embodiment, the processing unit 13 not only stops or suspends the application, but also turns off the touch panel. For example, the processing unit turns off, but is not limited to turning off, the image displayed on the touch panel 11.

Figure 4B:
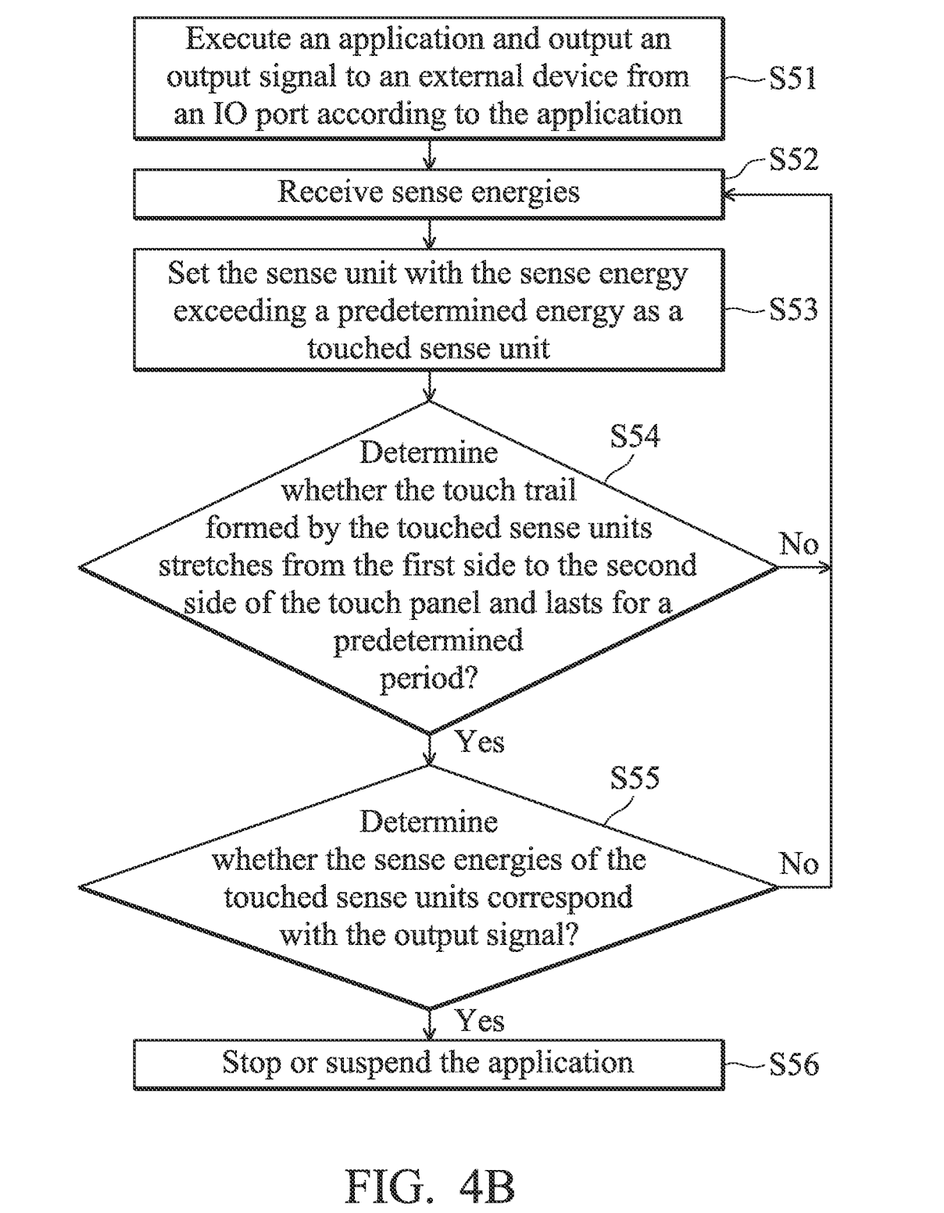
FIG. 4B shows a flowchart of another embodiment of the invention.

Please refer to FIG. 4B, which shows a flowchart of another embodiment of the invention. Steps S51, S52, S53, S54 and S56 in FIG. 4B are respectively identical to Steps S41, S42, S43, S44 and S45 in FIG. 4A, the difference is that the control method in FIG. 4B further includes Step S55. Reference for Steps S51, S52, S53, S54 and S56 in FIG. 4B can be found in the description for FIG. 4A, and is not repeated here for brevity.

In FIG. 4B, the processing unit 13 not only determines whether the touch trail formed by the touched sense units stretches from the first side 21 to the second side 22 of the touch panel 11 and lasts for the predetermined period (Step S54), but also determines the sense energy of the touched sense units varies with the magnitude of the output signal (S55). When the processing unit 13 determines that the sense energy of the touched sense units varies with the magnitude of the output signal, the control method proceeds to Step S56. Otherwise, the control method returns to Step S52. For example, when the processing unit 13 increases the volume of the music signal and the sense energy of the touched sense units increases accordingly, the control method enters Step S56.

Accordingly, when the electronic device of the embodiments detects that a touch trail formed by the connection cable of the external device stretches from a first side to a second side of a touch panel and lasts for a predetermined period, the electronic device is configured to stop or suspend an application. As a consequence, the user is not required to stop or suspend the application, providing increased convenience for the user.

While the invention has been described in connection with various aspects, it will be understood that the invention is capable of further modifications. This application is intended to cover any variations, uses or adaptation of the invention following, in general, the principles of the invention, and including such departures from the present disclosure as falling within the known and customary practice within the art to which the invention pertains.

What is claimed is:

1. An electronic device, comprising:
  a touch panel, comprising a plurality of sense units, wherein each sense unit is configured to receive sense energy, and the touch panel includes a first side and a second side opposite thereto;
  a processing unit, configured to execute an application, output an output signal according to the application, and set the sense unit with the sense energy exceeding a predetermined energy as a touched sense unit; and
  an input/output (IO) port, electrically coupled to an external device, and configured to transmit the output signal to the external device;
  wherein the sense energy exceeding the predetermined energy, received by the touched sense units, is produced by an electromagnetic effect resulting from the output signal when the external device is wound around the electronic device;
  wherein when a first condition is met, the processing unit is configured to stop or suspend the application;
  the first condition includes a touch trail formed by the touched sense units stretching from the first side to the second side and lasting for a predetermined period.

2. The electronic device of claim 1, wherein the first condition further includes the touch energy, which is determined by the output signal, corresponding to the touched sense unit being proportional to the output signal.

3. The electronic device of claim 2, wherein:
  the processing unit is further configured to add a test signal into the output signal, and output the output signal from the IO port to the external device; and
  the touch energy corresponding to the touched sense unit is proportional to the output signal injected by the test signal.

4. The electronic device of claim 1, wherein when the processing unit is configured to stop or suspend the application, and the processing unit is further configured to turn off the touch panel.

5. An electronic device, comprising:
  a touch panel, comprising a plurality of sense units, wherein each sense unit is configured to receive sense energy, and the touch panel includes a first side and a second side opposite thereto;
  a processing unit, configured to execute an application, receive an input signal according to the application, and set the sense unit with the sense energy exceeding a predetermined energy as a touched sense unit; and
  an input/output (IO) port, electrically coupled to an external device, and configured to receive the input signal from the external device;
  wherein the sense energy exceeding the predetermined energy, received by the touched sense units, is produced by an electromagnetic effect resulting from the input signal when the external device is wound around the electronic device;
  wherein when a first condition is met, the processing unit is configured to stop or suspend the application;
  the first condition includes a touch trail formed by the touched sense units stretching from the first side to the second side and lasting for a predetermined period.

6. The electronic device of claim 5, wherein the first condition further includes the touch energy corresponding to the touched sense unit being proportional to the input signal.

7. A control method, adopted by an electronic device which comprises a touch panel, a processing unit and an IO port, the control method comprising:
  executing an application, and outputting an output signal from the IO port to an external device according to the application, receiving sense energies, by a plurality of sense units of the touch panel;
  setting the sense unit with the sense energy exceeding a predetermined energy as a touched sense unit;
  wherein the sense energy exceeding the predetermined energy, received by the touched sense units, is produced by an electromagnetic effect resulting from the output signal when the external device is wound around the electronic device; and when a first condition is met, stopping or suspending, by the processing unit, the application;

wherein the first condition includes a touch trail formed by the touched sense units stretching from the first side to the second side and lasting for a predetermined period.

8. The control method of claim 7, wherein the first condition further includes the touch energy corresponding to the touched sense unit being proportional to the output signal.

9. The control method of claim 7, further comprising:
adding a test signal into the output signal; and
outputting the output signal from the IO port to the external device;
wherein the touch energy corresponding to the touched sense unit is proportional to the output signal injected by the test signal.

10. The control method of claim 7, further comprising:
when stopping or suspending the application, turning off, by the processing unit, the touch panel.

* * * * *